(12) United States Patent
Takahashi et al.

(10) Patent No.: US 10,601,345 B2
(45) Date of Patent: Mar. 24, 2020

(54) PIEZOELECTRIC DRIVING DEVICE, MOTOR, ROBOT, AND PUMP

(71) Applicant: Seiko Epson Corporation, Tokyo (JP)

(72) Inventors: Tomoaki Takahashi, Matsumoto (JP); Yutaka Arakawa, Hara (JP)

(73) Assignee: Seiko Epson Corporation (JP)

( * ) Notice: Subject to any disclaimer, the term of this patent is extended or adjusted under 35 U.S.C. 154(b) by 391 days.

(21) Appl. No.: 15/367,553

(22) Filed: Dec. 2, 2016

(65) Prior Publication Data
US 2017/0163175 A1    Jun. 8, 2017

(30) Foreign Application Priority Data

Dec. 3, 2015 (JP) ................. 2015-236650
Dec. 3, 2015 (JP) ................. 2015-236651

(51) Int. Cl.
| | |
|---|---|
| H02N 2/00 | (2006.01) |
| F04B 43/09 | (2006.01) |
| H02N 2/10 | (2006.01) |
| B25J 9/12 | (2006.01) |
| F04B 43/04 | (2006.01) |
| F04B 17/00 | (2006.01) |

(52) U.S. Cl.
CPC ............ H02N 2/001 (2013.01); B25J 9/12 (2013.01); F04B 43/046 (2013.01); F04B 43/095 (2013.01); H02N 2/004 (2013.01); H02N 2/0065 (2013.01); H02N 2/0075 (2013.01); H02N 2/103 (2013.01); H02N 2/108 (2013.01); F04B 17/003 (2013.01)

(58) Field of Classification Search
CPC ...... H02N 2/001; H02N 2/004; H02N 2/0065; H02N 2/0075; H02N 2/103; H02N 2/108; F04B 17/003; F04B 43/046; F04B 43/095
USPC ......................................... 417/413
See application file for complete search history.

(56) References Cited

U.S. PATENT DOCUMENTS

| | | |
|---|---|---|
| 5,410,204 A | 4/1995 | Imabayashi et al. |
| 2002/0067105 A1 | 6/2002 | Kosaka et al. |

(Continued)

FOREIGN PATENT DOCUMENTS

| | | |
|---|---|---|
| CN | 102651623 A | 8/2012 |
| CN | 204013280 U | 12/2014 |

(Continued)

*Primary Examiner* — Dominick L Plakkoottam
*Assistant Examiner* — Connor J Tremarche
(74) *Attorney, Agent, or Firm* — Harness, Dickey & Pierce, P.L.C.

(57) ABSTRACT

A piezoelectric driving device includes: a substrate including a fixed portion, and a vibrating body portion which is provided with a piezoelectric element and is supported by the fixed portion; and a contact portion which comes into contact with a driven body, and transmits movement of the vibrating body portion to the driven body, the contact portion is provided at an end portion in the longitudinal direction of the vibrating body portion, and a difference between a distance between the end portion when the contact portion is not pressed against the driven body and a tip end of the contact portion, and a distance between the end portion when the contact portion is pressed against the driven body and the tip end, is smaller than a total amplitude in the longitudinal direction in a case where the vibrating body portion is driven.

8 Claims, 11 Drawing Sheets

(56) References Cited

U.S. PATENT DOCUMENTS

| | | |
|---|---|---|
| 2002/0190612 A1 | 12/2002 | Ikeda et al. |
| 2005/0127791 A1 | 6/2005 | Ikeda et al. |
| 2005/0127795 A1 | 6/2005 | Torii et al. |
| 2007/0007856 A1 | 1/2007 | Ikeda et al. |
| 2010/0245517 A1* | 9/2010 | Miyazawa ............... B41J 23/00 347/104 |
| 2011/0018394 A1* | 1/2011 | Mukae ................ H01L 41/0913 310/323.02 |
| 2013/0140952 A1 | 6/2013 | Kamijo et al. |
| 2015/0103424 A1 | 4/2015 | Araki |

FOREIGN PATENT DOCUMENTS

| | | |
|---|---|---|
| JP | 06-022565 A | 1/1994 |
| JP | 2002-058266 A | 2/2002 |
| JP | 2003-008093 A | 1/2003 |
| JP | 2005-086991 A | 3/2005 |
| JP | 2005-203725 A | 7/2005 |
| JP | 2008-295234 A | 12/2008 |
| JP | 2010-180738 A | 8/2010 |
| JP | 2012-210049 A | 10/2012 |
| JP | 2013-121191 A | 6/2013 |
| JP | 2014-088879 A | 5/2014 |
| JP | 2015-080329 A | 4/2015 |

\* cited by examiner

PIEZOELECTRIC DRIVING DEVICE, MOTOR, ROBOT, AND PUMP

BACKGROUND

1. Technical Field

The present invention relates to a piezoelectric driving device, a motor, a robot, and a pump.

2. Related Art

A piezoelectric actuator (piezoelectric driving device) which vibrates a vibrating body by a piezoelectric element and drives a driven body is used in various fields since a magnet or a coil is not necessary.

In the piezoelectric driving device, it is described that a spring region is provided in the vicinity of a contact portion between the piezoelectric driving device and the driven body in order to prevent excessive vibration, to prevent point contact between an ultrasonic vibrator and a driven body member, and to improve power efficiency (for example, refer to JP-A-2008-295234, JP-A-6-22565, and JP-A-2015-80329).

However, in JP-A-2008-295234, JP-A-6-22565, and JP-A-2015-80329, only qualitative properties, such as the presence of the spring region, are described, and a spring constant of a specific spring region or a deformation amount of the contact portion due to pressing, is not mentioned.

SUMMARY

An advantage of some aspects of the invention is to solve at least a part of the problems described above, and the invention can be implemented as the following forms or application examples.

Application Example 1

A piezoelectric driving device according to this application example includes: a substrate including a fixed portion, and a vibrating body portion which is provided with a piezoelectric element and is supported by the fixed portion; and a contact portion which comes into contact with a driven body, and transmits movement of the vibrating body portion to the driven body, in which the contact portion is provided at an end portion in the longitudinal direction of the vibrating body portion, and in which a difference between a distance between the end portion when the contact portion is not pressed against the driven body and a tip end of the contact portion, and a distance between the end portion when the contact portion is pressed against the driven body and the tip end, is smaller than a total amplitude in the longitudinal direction in a case where the vibrating body portion is driven.

In the piezoelectric driving device, in the driving of the vibrating body portion (piezoelectric driving device), the contact portion can repeat coming into contact with and being separated from the driven body. As a result, in the piezoelectric driving device, it is possible to achieve stabilization of output characteristics.

Application Example 2

In the piezoelectric driving device according to Application Example 1, when the total amplitude is $X_0$ and a pushing force of the driven body on the contact portion is $F_0$, a spring constant K in the longitudinal direction of the contact portion may satisfy a relationship of $K > F_0/X_0$.

In the piezoelectric driving device with this configuration, the difference between the distance between the end portion of the vibrating body portion when the contact portion is not pressed against the driven body and a tip end of the contact portion, and a distance between the end portion of the vibrating body portion when the contact portion is pressed against the driven body and the tip end of the contact portion, can be reduced to be smaller than the total amplitude in the longitudinal direction in a case where the vibrating body portion is driven.

Application Example 3

In the piezoelectric driving device according to Application Example 2, the contact portion may include a tip end portion which is configured of the tip end, and an adhesive portion which is provided between the tip end portion and the vibrating body portion, and when a length in the longitudinal direction of the tip end portion is Ls, a length in the width direction which intersects the longitudinal direction of a contact surface between the tip end portion and the adhesive portion is Ws, a length in the direction which intersects the longitudinal direction and the width direction of the contact surface is Ts, a Young's modulus of the tip end portion is Es, and a Young's modulus of the adhesive portion is Ea, a length La in the longitudinal direction of the adhesive portion may satisfy a relationship of $La < (X_0/F_0) \times Ea \times Ws \times Ts - (Ls \times Ea)/Es$.

In the piezoelectric driving device with this configuration, the difference between the distance between the end portion of the vibrating body portion when the contact portion is not pressed against the driven body and a tip end of the contact portion, and a distance between the end portion of the vibrating body portion when the contact portion is pressed against the driven body and the tip end of the contact portion, can be reduced to be smaller than the total amplitude in the longitudinal direction in a case where the vibrating body portion is driven.

Application Example 4

A motor according to this application example includes: the piezoelectric driving device according to any one of Application Examples 1 to 3; and a rotor which is rotated by the piezoelectric driving device.

In the motor, it is possible to include the piezoelectric driving device according to the application example of the invention.

Application Example 5

A robot according to this application example includes: a plurality of ring portions; a joint which connects the plurality of ring portions to each other; and the piezoelectric driving device according to any one of Application Examples 1 to 3 which rotates the plurality of ring portions by the joint.

In the robot, it is possible to include the piezoelectric driving device according to the application example of the invention.

Application Example 6

A pump according to this application example includes: the piezoelectric driving device according to any one of Application Examples 1 to 3; a tube which transports liquid;

and a plurality of fingers which close the tube by driving of the piezoelectric driving device.

In the pump, it is possible to include the piezoelectric driving device according to the application example of the invention.

Application Example 7

A piezoelectric driving device according to this application example includes: a substrate including a fixed portion, and a vibrating body portion which is provided with a piezoelectric element and is supported by the fixed portion; and a contact portion which comes into contact with a driven body, and transmits movement of the vibrating body portion to the driven body, in which the contact portion is provided at an end portion in the direction orthogonal to the bending direction of the vibrating body portion, and in which when a spring constant in the bending direction of the contact portion is $K_T$, the maximum displacement amount in the bending direction of the contact portion is $XX_{Tmax}$, and a static friction force between the contact portion and the driven body is $F_S$, a relationship of $K_T \times X_{Tmax} < F_S$ is satisfied.

In the piezoelectric driving device, the contact portion can come into contact with the driven body without slipping. Accordingly, in the piezoelectric driving device, it is possible to minimize wear of the contact portion.

Application Example 8

In the piezoelectric driving device according to Application Example 7, the contact portion may include a tip end portion, and an adhesive portion which is provided between the tip end portion and the vibrating body portion, and the vibrating body portion may include a protruding portion which protrudes to the tip end portion side and is in contact with the tip end portion.

In the piezoelectric driving device with this configuration, it is possible to independently adjust the spring constant in the bending direction of the contact portion, and the spring constant in the direction orthogonal to the bending direction of the contact portion.

Application Example 9

In the piezoelectric driving device according to Application Example 7, the contact portion may include a tip end portion, and an adhesive portion which is provided between the tip end portion and the vibrating body portion, and the tip end portion may include a protruding portion which protrudes to the vibrating body portion side and is in contact with the vibrating body portion.

In the piezoelectric driving device with this configuration, it is possible to independently adjust the spring constant in the bending direction of the contact portion, and the spring constant in the direction orthogonal to the bending direction of the contact portion.

Application Example 10

A motor according to this application example includes: the piezoelectric driving device according to any one of Application Examples 7 to 9; and a rotor which is rotated by the piezoelectric driving device.

In the motor, it is possible to include the piezoelectric driving device according to the application example of the invention.

Application Example 11

A robot according to this application example includes: a plurality of ring portions; a joint which connects the plurality of ring portions to each other; and the piezoelectric driving device according to any one of Application Examples 7 to 9 which rotates the plurality of ring portions by the joint.

In the robot, it is possible to include the piezoelectric driving device according to the application example of the invention.

Application Example 12

A pump according to this application example includes: the piezoelectric driving device according to any one of Application Examples 7 to 9; a tube which transports liquid; and a plurality of fingers which close the tube by driving of the piezoelectric driving device.

In the pump, it is possible to include the piezoelectric driving device according to the application example of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, appropriate embodiments of the invention will be described in detail by using the drawings. In addition, the embodiments which will be described hereinafter do not wrongfully restrict contents of the invention described within a range of the appended claims. In addition, all of the configurations which will be described hereinafter are not limited to necessary requirements.

First Embodiment

1. Piezoelectric Driving Device

First, the piezoelectric driving device according to the embodiment will be described with reference to the drawings.

Figure 1:
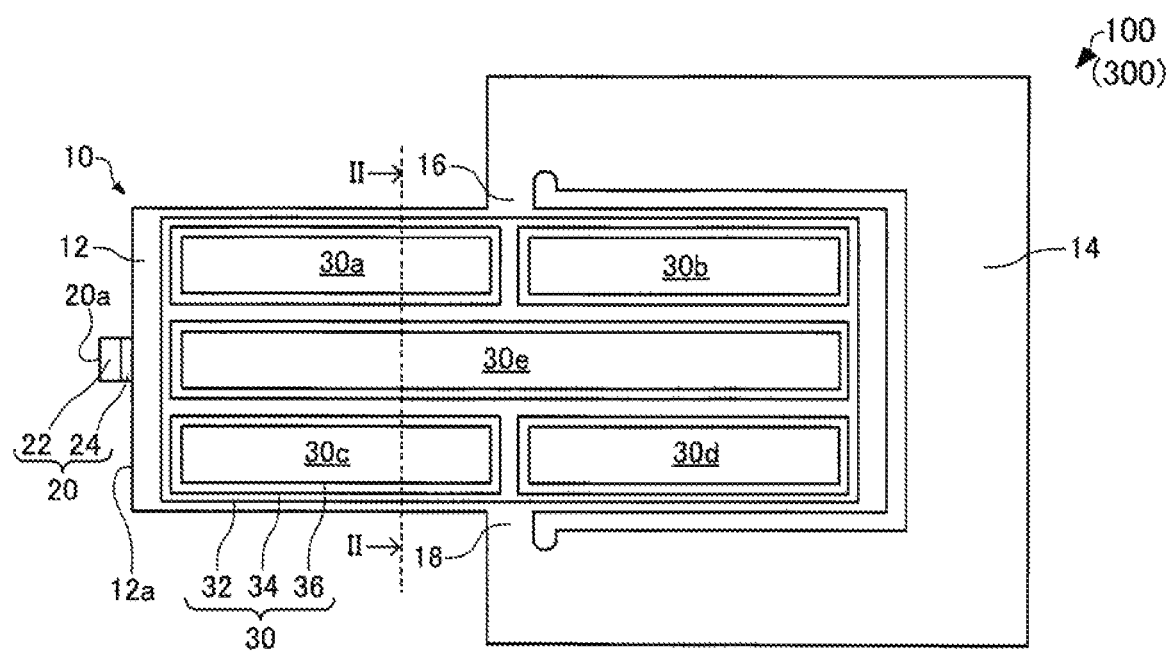
FIG. 1 is a plan view schematically illustrating a piezoelectric driving device according to a first embodiment.
Figure 2:
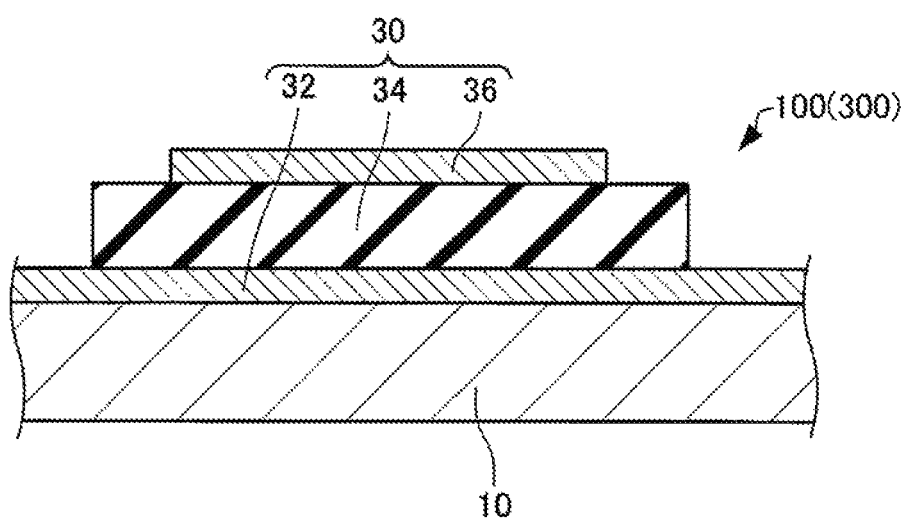
FIG. 2 is a sectional view schematically illustrating the piezoelectric driving device according to the first embodiment.
Figure 3:
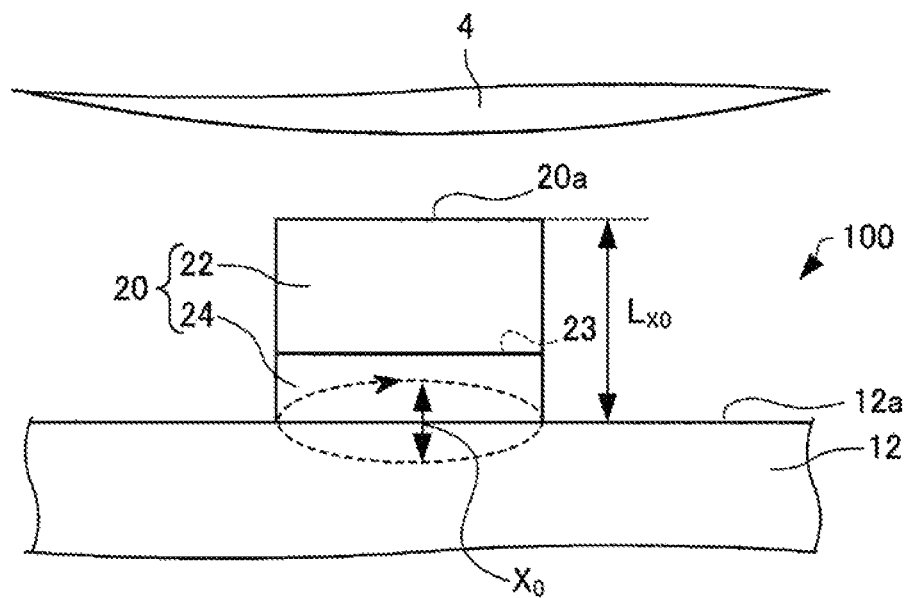
FIG. 3 is a plan view schematically illustrating the piezoelectric driving device according to the first embodiment.
Figure 4:
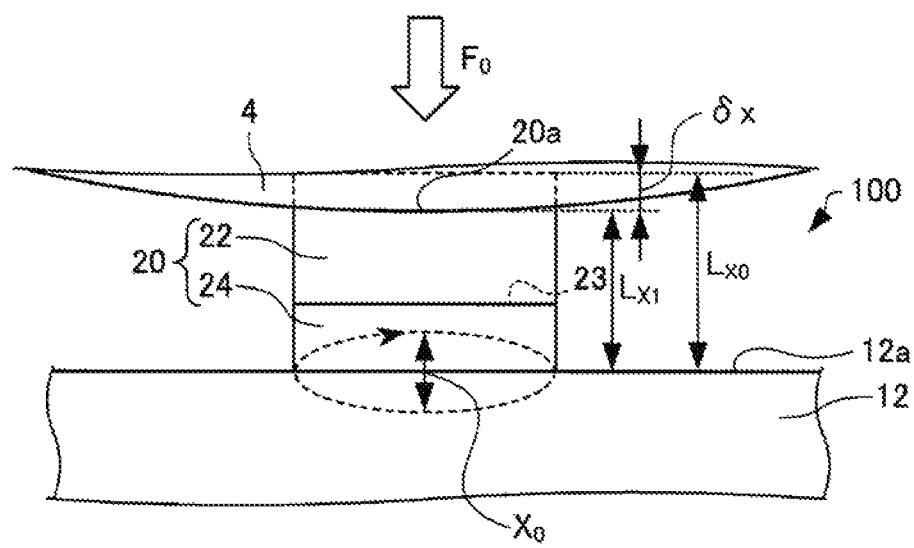
FIG. 4 is a plan view schematically illustrating the piezoelectric driving device according to the first embodiment.
Figure 5:
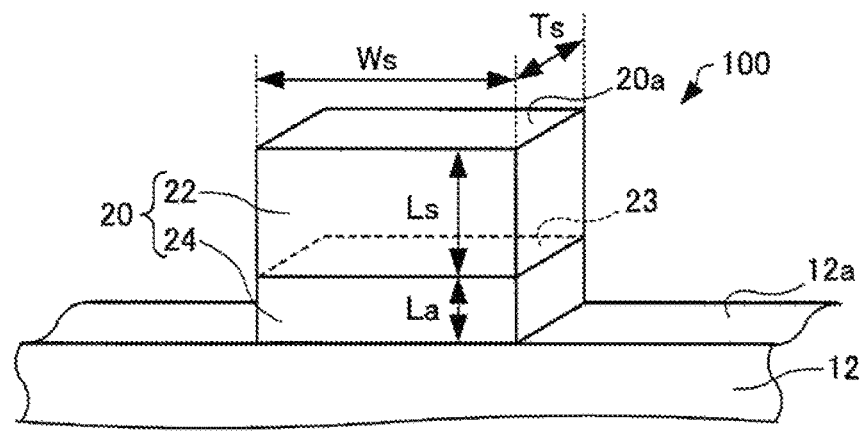
FIG. 5 is a perspective view schematically illustrating the piezoelectric driving device according to the first embodiment.

FIG. 1 is a plan view schematically illustrating a piezoelectric driving device 100 according to the embodiment. FIG. 2 is a sectional view taken along line II-II of FIG. 1 schematically illustrating the piezoelectric driving device 100 according to the embodiment. FIGS. 3 and 4 are plan views schematically illustrating the vicinity of a contact portion 20 of the piezoelectric driving device 100 according to the embodiment. FIG. 5 is a perspective view schematically illustrating the vicinity of the contact portion 20 of the piezoelectric driving device 100 according to the embodiment.

As illustrated in FIGS. 1 to 5, the piezoelectric driving device 100 includes a substrate 10, a contact portion 20, and a piezoelectric element 30.

The substrate 10 is configured of, for example, an accumulated body made of a silicon substrate; a silicon oxide layer provided on the silicon substrate; and a zirconium oxide layer provided on the silicon oxide layer.

As illustrated in FIG. 1, the substrate 10 includes a vibrating body portion 12, a fixed portion 14, a first connection portion 16, and a second connection portion 18. In the illustrated example, a shape of a plane (a shape which is viewed from the thickness direction of the substrate 10) of the vibrating body portion 12, is a rectangular shape. On the vibrating body portion 12, the piezoelectric element 30 is provided, and the vibrating body portion 12 can vibrate by deformation of the piezoelectric element 30. The fixed portion 14 supports the vibrating body portion 12 via the connection portions 16 and 18. The fixed portion 14 is fixed to, for example, an external member (not illustrated). In the illustrated example, the connection portions 16 and 18 extend in the direction orthogonal to the longitudinal direction from a center portion in the longitudinal direction of the vibrating body portion 12, and are connected to the fixed portion 14.

The contact portion 20 is provided at an end portion 12a in the longitudinal direction (hereinafter, also simply referred to as "longitudinal direction") of the vibrating body portion 12. In a plan view (when viewed from the thickness direction of the substrate 10), the end portion 12a is configured of a short side of the vibrating body portion 12. The contact portion 20 is a protruding portion which protrudes from the end portion 12a. In the illustrated example, the shape of the contact portion 20 is a shape of a rectangular parallelepiped. The contact portion 20 has a tip end 20a, and the contact portion 20 is a member which comes into contact with a driven member (driven body) (specifically, a rotor 4 illustrated in FIGS. 3 and 4) at the tip end 20a, and which transmits the movement of the vibrating body portion 12 to the driven member. The shape of the rotor 4 is, for example, a columnar shape and a spherical shape. The tip end 20a is a surface opposite to the surface which is in contact with the end portion 12a of the contact portion 20.

The contact portion 20 includes a tip end portion 22 which configures the tip end 20a, and an adhesive portion 24 which is provided between the tip end portion 22 and the vibrating body portion 12. A material of the tip end portion 22 is, for example, ceramics (specifically, alumina ($Al_2O_3$), zirconia ($ZrO_2$), silicon nitride ($Si_3N$), and a mixture thereof). The adhesive portion 24 is configured of an adhesive which adheres the tip end portion 22 and the vibrating body portion 12 to each other. In the illustrated example, the shape of the tip end portion 22 and the adhesive portion 24 is a shape of a rectangular parallelepiped.

Here, a difference ox between a distance $L_{x0}$ (refer to FIG. 3) between the end portion 12a when the contact portion 20 is not pressed against the rotor 4 (when the contact portion 20 is not pushed) and the tip end 20a, and a distance $L_{x1}$ (refer to FIG. 4) between the end portion 12a when the contact portion 20 is pressed against the rotor 4 (when the contact portion 20 is pressed) and the tip end 20a, is smaller than a total amplitude $X_0$ in the longitudinal direction of the vibrating body portion 12 in a case where the vibrating body portion 12 is driven. A boundary portion (connection portion) between the vibrating body portion 12 and the contact portion 20 is driven by the driving of the piezoelectric element 30 drawing an ellipse. The total amplitude $X_0$ is, for example, a length of a component in the longitudinal direction of the vibrating body portion 12 of the ellipse drawn by the boundary portion of the vibrating body portion 12. In the illustrated example, the total amplitude $X_0$ is a length of a short axis of the ellipse drawn by the boundary portion of the vibrating body portion 12.

When the total amplitude in the longitudinal direction of the vibrating body portion 12 in a case where the vibrating body portion 12 is driven is $X_0$, and a pushing force (pushing force in the longitudinal direction) of the rotor 4 to the contact portion 20 is $F_0$, a spring constant K in the longitudinal direction of the contact portion 20 satisfies a relationship of the following expression (1).

$$K > F_0/X_0 \quad (1)$$

In addition, the contact portion 20 has the spring constant to be deformed to a certain degree when the rotor 4 is pressed.

As illustrated in FIG. 5, when a length in the longitudinal direction of the tip end portion 22 is Ls, a length in the width direction orthogonal to the longitudinal direction of a contact surface 23 between the tip end portion 22 and the adhesive portion 24 is Ws, a length in the direction orthogonal to the longitudinal direction and the width direction of the contact surface 23 is Ts, a Young's modulus of the tip end portion 22 is Es, and a Young's modulus of the adhesive portion 24 is Ea, a length La in the longitudinal direction of the adhesive portion 24 satisfies a relationship of the following expression (2). Furthermore, it is preferable that the length La satisfies a relationship of the following expression (3).

$$La < (X_0/F_0) \times Ea \times Ws \times Ts - (Ls \times Ea)/Es \quad (2)$$

$$La < (1/2) \times (X_0/F_0) \times Ea \times Ws \times Ts - (1/2) \times (Ls \times Ea)/Es \quad (3)$$

The length Ws is, for example, 0.1 mm to 0.5 mm. The length Ls is, for example, 0.1 mm to 0.5 mm. The length Ts is, for example, 0.1 mm to 0.5 mm. The total amplitude $X_0$ is, for example, 0.1 μm to 5 μm. More specifically, Ws=0.2 mm, Ts=0.2 mm, Ls=0.1 mm, and $X_0$=1 μm.

As illustrated in FIG. 2, the piezoelectric element is provided on the substrate 10. Specifically, the piezoelectric element 30 is provided on the vibrating body portion 12. The piezoelectric element 30 includes a first electrode 32, a piezoelectric body layer 34, and a second electrode 36.

The first electrode 32 is provided on the vibrating body portion 12. In the example illustrated in FIG. 1, a shape of a plane of the first electrode 32 is a rectangular shape. The first electrode 32 may be configured of an iridium layer provided on the vibrating body portion 12, and a platinum layer provided on the iridium layer. The thickness of the iridium layer is, for example, 5 nm to 100 nm. The thickness of the platinum layer is, for example, 50 nm to 300 nm. In addition, the first electrode 32 may be mixed or accumulated by a metal layer made of Ti, Pt, Ta, Ir, Sr, In, Sn, Au, Al, Fe, Cr, Ni, and Cu, and two or more of the metal layers. The first electrode 32 is one electrode for applying a voltage to the piezoelectric body layer 34.

The piezoelectric body layer 34 is provided on the first electrode 32. In the illustrated example, a shape of a plane of the piezoelectric body layer 34 is a rectangular shape. The thickness of the piezoelectric body layer 34 is, for example, 50 nm to 20 μm, and preferably, 1 μm to 7 μm. In this manner, the piezoelectric element 30 is a thin-film piezoelectric element. When the thickness of the piezoelectric body layer 34 is smaller than 50 nm, there is a case where an output of the piezoelectric driving device 100 decreases. Specifically, when the voltage applied to the piezoelectric body layer 34 for increasing the output increases, there is a case where the piezoelectric body layer 34 causes dielectric breakdown. When the thickness of the piezoelectric body layer 34 is greater than 20 μm, there is a case where cracks are generated in the piezoelectric body layer 34.

As the piezoelectric body layer 34, a piezoelectric material of perovskite type oxide is used. Specifically, the material of the piezoelectric body layer 34 is, for example, lead zirconate titanate ($Pb(Zr,Ti)O_3$:PZT), and niobic acid titanic acid zirconic acid lead ($Pb(Zr,Ti,Nb)O_3$:PZTN). The piezoelectric body layer 34 can be deformed (stretch and contract) as the voltage is applied by the electrodes 32 and 36.

The second electrode 36 is provided on the piezoelectric body layer 34. In the illustrated example, a shape of a plane of the second electrode 36 is a rectangular shape. The second electrode 36 may be configured of a tightly adhering layer provided on the piezoelectric body layer 34, and a conductive layer provided on the tightly adhering layer. The thickness of the tightly adhering layer is, for example, 10 nm to 100 nm. The tightly adhering layer is, for example, a TiW layer, a Ti layer, a Cr layer, a NiCr layer, or an accumulated body of the layers. The thickness of the conductive layer is, for example, 1 μm to 10 μm. The conductive layer is, for example, a Cu layer, an Au layer, an Al layer, or an accumulated body of the layers. The second electrode is another electrode for applying the voltage to the piezoelectric body layer 34.

A plurality of piezoelectric elements 30 are provided. In the example illustrated in FIG. 1, five piezoelectric elements 30 are provided (piezoelectric elements 30a, 30b, 30c, 30d, and 30e). In a plan view, for example, areas of the piezoelectric elements 30a to 30d are the same as each other, and the piezoelectric element 30e has an area which is greater than the areas of the piezoelectric elements 30a to 30d. The piezoelectric element 30e is provided along the longitudinal direction of the vibrating body portion 12 at the center portion in the lateral direction of the vibrating body portion 12. The piezoelectric elements 30a, 30b, 30c, and 30d are provided at four corners of the vibrating body portion 12. In the illustrated example, in the piezoelectric elements 30a to 30e, the first electrode 32 is provided as one continuous conductive layer.

In addition, although not being illustrated, the piezoelectric driving device 100 may have an insulating layer provided to cover the piezoelectric element 30, a first wiring layer which is electrically connected to the first electrode 32, and a second wiring layer which is electrically connected to the second electrode 36.

Figure 6:
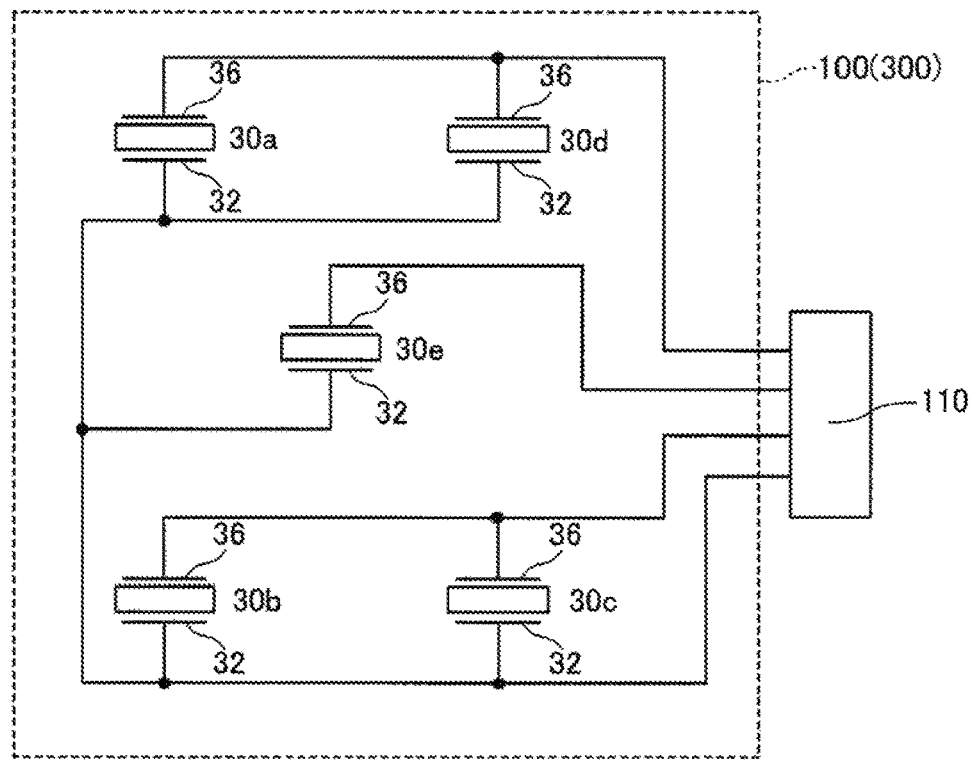
FIG. 6 is a view illustrating an equivalent circuit for illustrating the piezoelectric driving device according to the first embodiment.

FIG. 6 is a view illustrating an equivalent circuit for illustrating the piezoelectric driving device 100. The piezoelectric element 30 is divided into three groups. A first group has two piezoelectric elements 30a and 30d. A second group has two piezoelectric elements 30b and 30c. A third group has one piezoelectric element 30e. As illustrated in FIG. 6, the piezoelectric elements 30a and 30d of the first group are connected to each other in parallel, and are connected to a driving circuit 110. The piezoelectric elements 30b and 30c of the second group are connected to each other in parallel, and are connected to the driving circuit 110. The piezoelectric element 30e of the third group is independently connected to the driving circuit 110.

The driving circuit 110 applies an AC voltage or an undulating voltage which periodically changes in predetermined piezoelectric element among the five piezoelectric elements 30a, 30b, 30c, 30d, and 30e, for example, between the first electrode 32 and the second electrode 36 of the piezoelectric elements 30a, 30d, and 30e. Accordingly, the piezoelectric driving device 100 can ultrasonically vibrates the vibrating body portion 12, and can rotate the rotor (driven member) which comes into contact with the contact portion 20 in the predetermined rotational direction. Here, "undulating voltage" means a voltage obtained by applying a DC offset to the AC voltage, and the direction of the voltage (electric field) of the undulating voltage is one direction which is from one electrode toward the other electrode.

In addition, it is preferable that the direction of the electric field is from the second electrode 36 toward the first electrode 32 rather than the direction from the first electrode 32 toward the second electrode 36. In addition, by applying the AC voltage or the undulating voltage to between the electrodes 32 and 36 of the piezoelectric elements 30b, 30c, and 30e, it is possible to rotate the rotor which comes into contact with the contact portion 20 in the reverse direction.

Figure 7:
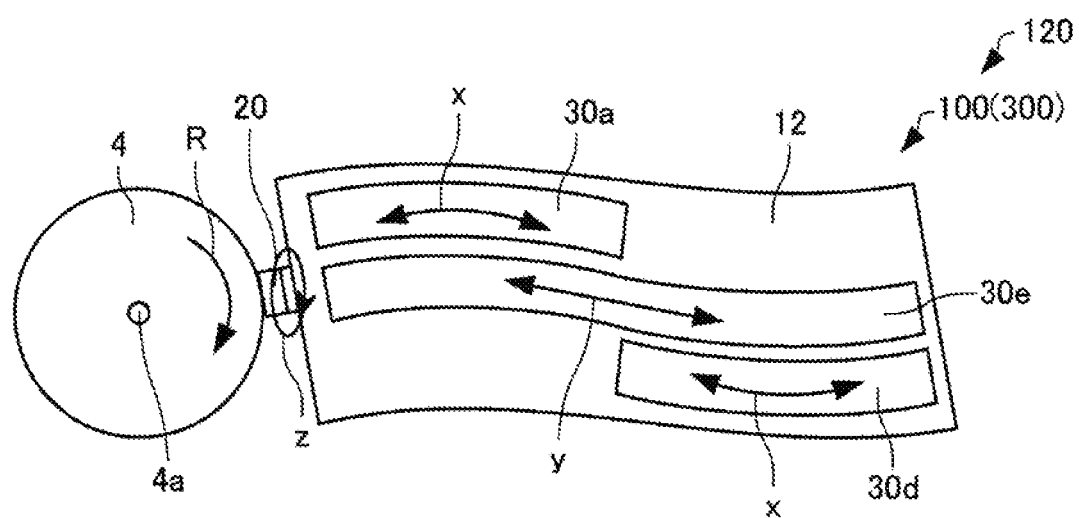
FIG. 7 is a view illustrating an operation of the piezoelectric driving device according to the first embodiment.

FIG. 7 is a view illustrating an operation of the vibrating body portion 12 of the piezoelectric driving device 100. As illustrated in FIG. 7, the contact portion 20 of the piezoelectric driving device 100 comes into contact with an outer circumference of the rotor 4 which serves as the driven member. The driving circuit 110 applies the AC voltage or the undulating voltage to between the electrodes 32 and 36 of the piezoelectric elements 30a and 30d. Accordingly, the piezoelectric elements 30a and 30d stretch and contract in the direction of an arrow x. Meanwhile, the vibrating body portion 12 bends and vibrates in the plane of the vibrating body portion 12, and is deformed in a meandering shape (S shape). Furthermore, the driving circuit 110 applies the AC voltage or the undulating voltage to between the electrodes 32 and 36 of the piezoelectric element 30e. Accordingly, the piezoelectric element 30e stretches and contracts in the direction of an arrow y. Accordingly, the vibrating body portion 12 longitudinally vibrates in the plane of the vibrating body portion 12. By bending and vibrating and longitudinally vibrating the vibrating body portion 12 as described above, the boundary portion between the vibrating body portion 12 and the contact portion 20 performs elliptical motion similar to an arrow z. As a result, the rotor 4 rotates in the predetermined direction R (clockwise direction in the illustrated example) around a center 4a.

In addition, in a case where the driving circuit 110 applies the AC voltage or the undulating voltage to between the electrodes 32 and 36 of the piezoelectric elements 30b, 30c and 30e, the rotor 4 rotates in the direction (counterclockwise direction) opposite to the direction R.

In addition, it is preferable that a resonance frequency of the bending vibration and a resonance frequency of the longitudinal vibration of the vibrating body portion 12 are the same as each other. Accordingly, the piezoelectric driving device 100 can efficiently rotate the rotor 4.

As illustrated in FIG. 7, a motor 120 according to the embodiment includes the piezoelectric driving device (piezoelectric driving device 100 in the illustrated example) according to the invention, and the rotor 4 rotated by the piezoelectric driving device 100. The material of the rotor 4 is, for example, ceramics. In the illustrated example, the shape of the rotor 4 is a columnar shape.

The piezoelectric driving device 100 has, for example, the following characteristics.

In the piezoelectric driving device 100, the difference δx between the distance $L_{x0}$ between the end portion 12a when the contact portion 20 is not pressed against the rotor 4 and the tip end 20a, and the distance $L_{x1}$ between the end portion 12a when the contact portion 20 is pressed against the rotor 4 and the tip end 20a, is smaller than the total amplitude $X_0$ in the longitudinal direction in a case where the vibrating body portion 12 is driven. Therefore, in the piezoelectric driving device 100, in the driving of the vibrating body portion 12 (piezoelectric driving device 100), the contact portion 20 can repeat coming into contact with and being separated from the rotor 4. As a result, in the piezoelectric driving device 100, it is possible to achieve stabilization of the output characteristics.

For example, in a case where the difference δx is equal to or greater the total amplitude $X_0$, in the driving of the vibrating body portion 12, the contact portion 20 always comes into contact with the rotor 4, and there is a case where the rotor 4 does not rotate. Therefore, there is a case where the output characteristics become unstable.

In the piezoelectric driving device 100, the expression (1) is satisfied. Accordingly, in the piezoelectric driving device 100, it is possible to reduce the difference δx to be smaller than the total amplitude $X_0$ (specifically, refer to "3. Experiment Example" which will be described later for more detail).

In the piezoelectric driving device 100, the expression (2) is satisfied. Accordingly, in the piezoelectric driving device 100, it is possible to reduce the difference δx to be smaller than the total amplitude $X_0$ (specifically, refer to "3. Experiment Example" which will be described later for more detail). For example, in the piezoelectric driving device 100, based on the expression (2), by adjusting the length La of the adhesive portion 24, it is possible to reduce the difference δx to be smaller than the total amplitude $X_0$.

Here, since the piezoelectric driving device 100 is used, for example, in a small-sized robot, the piezoelectric driving device 100 is also required to be small and to have stable output characteristics. Therefore, there is a case where it is not possible to increase the total amplitude $X_0$ or the lengths Ws, Ls, and Ts. Furthermore, in order to ensure durability, not only the size of the tip end portion 22 but also the material thereof is restricted. Furthermore, the material of the adhesive portion 24 is restricted in order to ensure adhesiveness between the tip end portion 22 and the vibrating body portion 12. In other words, a changeable range of parameters of the total amplitude $X_0$, the lengths Ws, Ts, and Ls, and the Young's moduli Es and Ea, is narrow (degree of freedom is low). Therefore, by changing the parameters, there is a case where it is difficult to realize the reduction of the difference ox to be smaller than the total amplitude $X_0$. Here, as described above, based on the expression (2), there is a case where it is effective to adjust the length La of the adhesive portion 24, and to reduce the difference δx to be smaller than the total amplitude $X_0$.

In the piezoelectric driving device 100, the expression (3) is satisfied. Therefore, in the piezoelectric driving device 100, in an upper half (half on the rotor 4 side) of the total amplitude $X_0$ in the longitudinal direction in a case where the vibrating body portion 12 is driven, the contact portion 20 can come into contact with the rotor 4, and in a lower half (half on aside opposite to the rotor 4) of the total amplitude $X_0$, the contact portion 20 can be separated from the rotor 4 (specifically, refer to "3. Experiment Example" which will be described later). Accordingly, in the piezoelectric driving device 100, the contact portion 20 can efficiently transmit the movement of the vibrating body portion 12 to the rotor 4. In addition, the difference δx may be equal to or lower than the half of the total amplitude $X_0$.

2. Manufacturing Method of Piezoelectric Driving Device

Next, a manufacturing method of the piezoelectric driving device according to the embodiment will be described with reference to the drawings.

As illustrated in FIGS. 1 and 2, the first electrode 32 is formed on the vibrating body portion 12 of the substrate 10. The first electrode 32 is formed, for example, by film formation by a sputtering method, a chemical vapor deposition (CVD) method, or a vacuum evaporation method; and by a patterning (patterning by photolithography and etching).

Next, the piezoelectric body layer 34 is formed on the first electrode 32. After repeating forming a precursor layer by a liquid-phase method and crystallization of the precursor layer, for example, the piezoelectric body layer 34 is formed by the patterning. The liquid-phase method is a method of film-forming a thin-film material by using original material liquid including a configuration member of a thin film (piezoelectric body layer), and specifically, is a sol-gel method or a metal organic deposition (MOD) method. In an oxide atmosphere, the crystallization is performed by heat treatment of, for example, 700° C. to 800° C.

Next, the second electrode 36 is formed in the piezoelectric body layer 34. The second electrode 36 is formed, for example, by a method which is the same as that of the first electrode 32. In addition, although not being illustrated, the patterning of the second electrode 36 and the patterning of the piezoelectric body layer 34 may be performed as the same process.

By the above process, it is possible to form the piezoelectric element 30 on the vibrating body portion 12 of the substrate 10.

Next, the tip end portion 22 adheres to the end portion 12a of the vibrating body portion 12 via the adhesive portion 24. Accordingly, it is possible to provide the contact portion 20 at the end portion 12a.

By the above process, it is possible to manufacture the piezoelectric driving device 100.

3. Experiment Example

Hereinafter, an experiment example will be illustrated, and the invention will be described in more detail. In addition, the invention is not limited to any of the following experiment examples.

3.1. Calculation of Expression (1)

As illustrated in FIG. 4, when a deformation amount of the contact portion is $\delta x$ in a case where the rotor is pressed to the contact portion by the force (pushing force) $F_0$, the spring constant K in the longitudinal direction of the contact portion becomes the following equation (4), and it is possible to obtain the following equation (5) by developing the equation (4).

$$K=F_0/\delta x \quad (4)$$

$$\delta x=F_0/K \quad (5)$$

Meanwhile, spring constant $K_0$ in the longitudinal direction of the contact portion in a case of being deformed only by the same amount (length) as that of the total amplitude $X_0$ of the vibrating body portion, becomes the following equation (6), and it is possible to obtain the following equation (7) by developing the equation (6).

$$K_0=F_0/X_0 \quad (6)$$

$$X_0=F_0/K_0 \quad (7)$$

In order to reduce the deformation amount $\delta x$ to be smaller than the total amplitude $X_0$, since $\delta x<X_0$, by the equations (5) and (7), it is possible to obtain the following expression (8), and further, it is possible to obtain the following expression (9) by developing the expression (8). In addition, it is possible to obtain the expression (1) by the equation (6) and the expression (9).

$$F_0/K<F_0/K_0 \quad (8)$$

$$K>K_0 \quad (9)$$

$$K>F_0/X_0 \quad (1)$$

3.2. Calculation of Equation (2)

A spring constant Ks of the tip end portion of the contact portion becomes the following equation (10). In addition, a spring constant Ka of the adhesive portion of the contact portion becomes the following equation (11).

$$Ks=Es\times(Ws\times Ts)/Ls \quad (10)$$

$$Ka=Es\times(Ws\times Ts)/La \quad (11)$$

When satisfying the following expression (12), in the driving of the vibrating body portion 12, the contact portion 20 can repeat coming into contact with and being separated from the rotor 4.

$$1/((1/Ka)+(1/Ks))>F_0/X_0 \quad (12)$$

It is possible to obtain the following expressions (13) and (14) by developing the expression (12), and to obtain the following expression (15) by the equation (10), the equation (11), and the expression (14). In addition, it is possible to obtain the expression (2) by developing the expression (15).

$$1/Ka+1/Ks<X_0/F_0 \quad (13)$$

$$1/Ka<X_0/F_0-1/Ks \quad (14)$$

$$La/(Ea\times Ws\times Ts)<X_0/F_0-Ls/(Es\times Ws\times Ts) \quad (15)$$

$$La<(X_0/F_0)\times Ea\times Ws\times Ts-(Ls\times Ea)/Es \quad (2)$$

For example, in a case where each parameter is set as follows by using alumina as the tip end portion, and by using an elastic adhesive 590 manufactured by 3M Company as the adhesive layer, $La<1.5\times10^{-6}$ m is achieved by the expression (2).

$F_0=0.4$ N $X_0=5\times10^{-7}$ m $Es=3.7\times10^{11}$ Pa $Ws=2\times10^{-4}$ m $Ls=1\times10^{-4}$ m $Ts=2\times10^{-4}$ m $Ea=3\times10^{7}$ Pa Furthermore, as the following equation (16), by performing computation similar to the description above, it is possible to obtain the above-described expression (3). The equation (16) is a condition that the contact portion is deformed only by the amount (length) which corresponds to a half of the total amplitude $X_0$. Therefore, by satisfying the expression (3), in the half of the total amplitude $X_0$, the contact portion can come into contact with the rotor, and in the other half of the total amplitude $X_0$, the contact portion can be separated from the rotor 4.

$$\delta x=(1/2)\times X_0 \quad (16)$$

$$La<(1/2)\times(X_0/F_0)\times Ea\times Ws\times Ts-(1/2)\times(Ls\times Ea)/Es \quad (3)$$

4. Modification Example of Piezoelectric Driving Device

Figure 8:
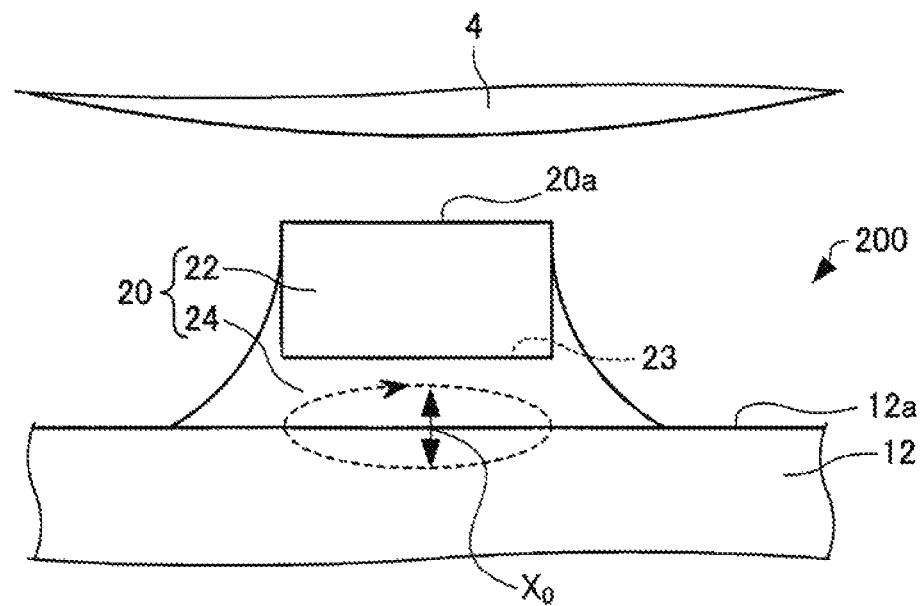
FIG. 8 is a plan view schematically illustrating a piezoelectric driving device according to a modification example of the first embodiment.

Next, the piezoelectric driving device according to the modification example of the embodiment will be described with reference to the drawings. FIG. 8 is a plan view schematically illustrating a piezoelectric driving device 200 according to the modification example of the embodiment. Hereinafter, in the piezoelectric driving device 200 according to the modification example of the embodiment, the members having functions similar to those of the configuration members of the piezoelectric driving device 100 according to the embodiment will be given the same numeral references, and the detailed description thereof will be omitted.

In the above-described piezoelectric driving device 100, as illustrated in FIG. 3, the adhesive portion 24 is provided only between the tip end portion 22 and the vibrating body portion 12. Meanwhile, in the piezoelectric driving device 200, as illustrated in FIG. 8, the adhesive portion 24 is also provided on a side of the tip end portion 22.

In the piezoelectric driving device 200, similar to the piezoelectric driving device 100, it is possible to achieve stabilization of the output characteristics. Furthermore, in the piezoelectric driving device 200, compared to a case where the adhesive portion 24 is provided only between the tip end portion 22 and the vibrating body portion 12, it is possible to increase an adhesive strength between the tip end portion 22 and the vibrating body portion 12.

In addition, in the piezoelectric driving device 200, it is also possible to employ the computation of "3. Experiment Example". In this case, the contact surface 23 between the tip end portion 22 and the adhesive portion 24 becomes a surface (in the illustrated example, a surface parallel to the end portion 12a) which is not a side surface of the tip end portion 22.

Second Embodiment

5. Piezoelectric Driving Device

Figure 9:
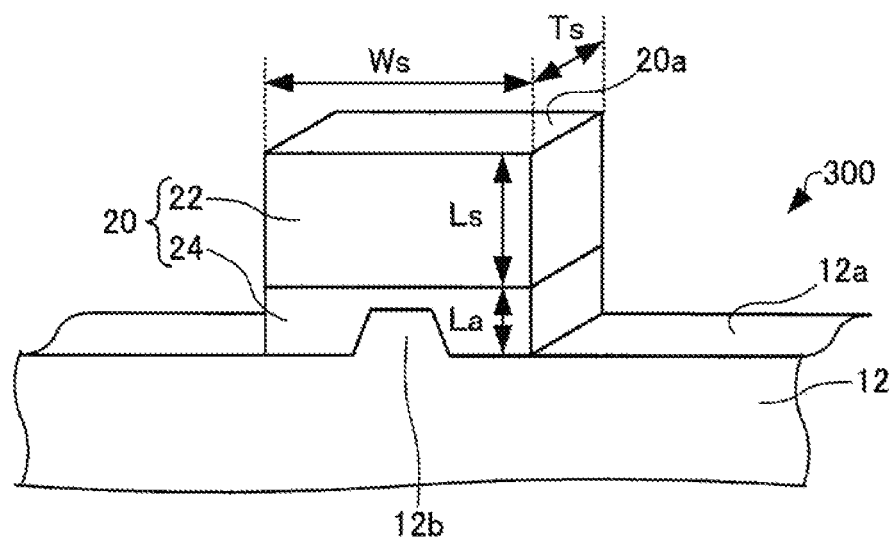
FIG. 9 is a perspective view schematically illustrating a piezoelectric driving device according to a second embodiment.
Figure 10:
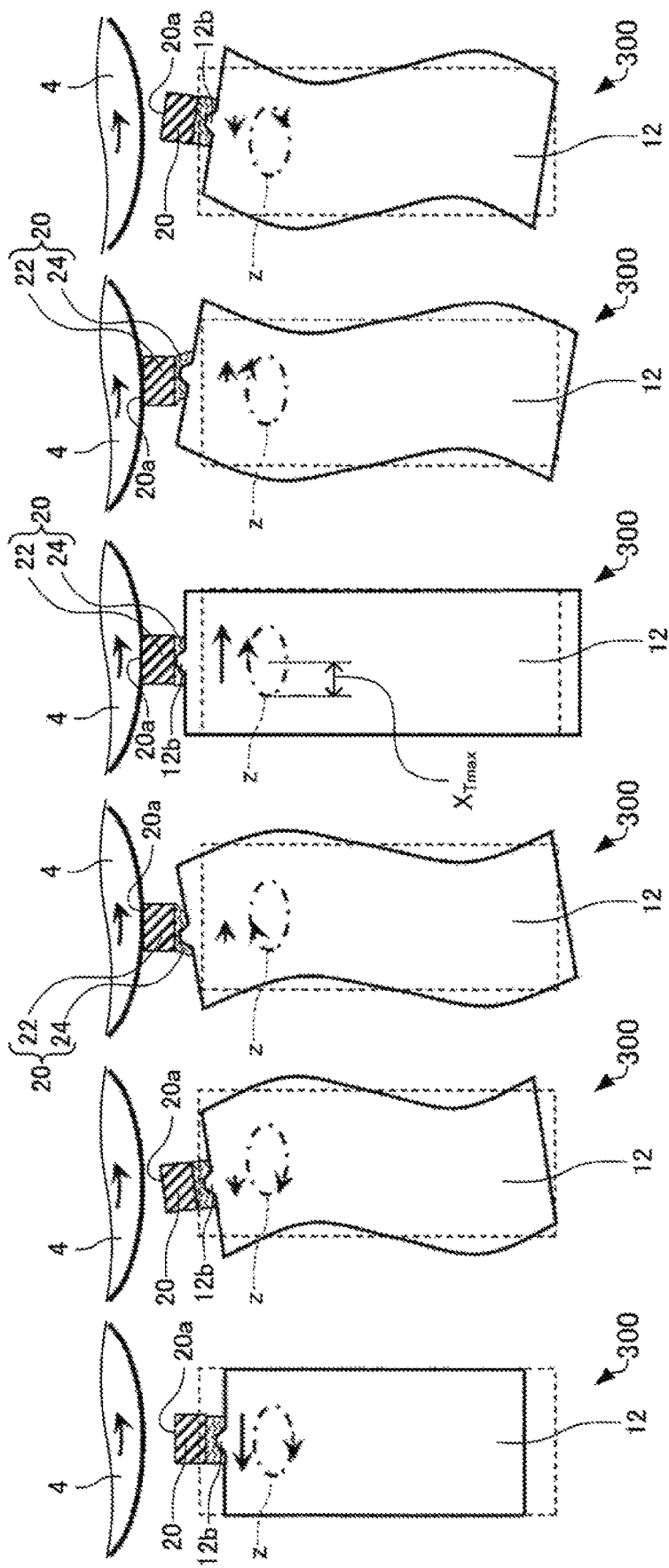
FIGS. 10A to 10F are views illustrating operations of the piezoelectric driving device according to the second embodiment.

FIG. 9 is a perspective view schematically illustrating the vicinity of the contact portion 20 of a piezoelectric driving device 300 according to the embodiment.

The piezoelectric driving device 300 of the embodiment is different from the first embodiment in that a protruding portion 12b which protrudes to the tip end portion 22 side of the contact portion 20 is formed at the end portion 12a of the vibrating body portion 12. Hereinafter, the configuration members which are the same as those of the first embodiment will be given the same numeral references, and here, the description thereof will be omitted or simplified.

As illustrated in FIG. 9, the piezoelectric driving device 300 of the embodiment includes the substrate 10, the contact portion 20, and the piezoelectric element 30, similar to the first embodiment.

The contact portion 20 is provided at the end portion 12a in the longitudinal direction (hereinafter, also simply referred to as "longitudinal direction") of the vibrating body portion 12. The longitudinal direction is the direction orthogonal to the bending direction of the vibrating body portion 12. In the example illustrated in FIG. 9, the vibrating body portion 12 has the protruding portion 12b which protrudes to the tip end portion 22 side of the contact portion 20 at the end portion 12a. The contact portion 20 is provided, for example, to be fitted to the protruding portion 12b. In the illustrated example, the protruding portion 12b is separated from the tip end portion 22. In addition, for convenience, in FIGS. 1 and 7, the protruding portion 12b is not illustrated.

The contact portion 20 includes the tip end 20a, and the contact portion 20 is a member which comes into contact with the driven member (rotor 4 illustrated in FIG. 7) at the tip end 20a, and which transmits the movement of the vibrating body portion 12 to the driven member. The shape of the rotor 4 is, for example, a columnar shape and a spherical shape.

In the example illustrated in FIG. 9, a length in the width direction orthogonal to the longitudinal direction of the tip end portion 22 and the adhesive portion 24 of the contact portion 20 is Ws, a length in the direction orthogonal to the longitudinal direction and the width direction of the tip end portion 22 and the adhesive portion 24 is Ts, a length in the longitudinal direction of the tip end portion 22 is Ls, and a length in the longitudinal direction of the adhesive portion 24 is La.

The length Ws is, for example, 0.1 mm to 0.5 mm. The length Ts is, for example, 0.1 mm to 0.5 mm. The length Ls is, for example, 0.1 mm to 0.5 mm. The length La is, for example, 0.5 μm to 15 μm. More specifically, Ws=0.2 mm, Ts=0.2 mm, Ls=0.1 mm, and La=3 μm.

FIGS. 10A to 10F are views more specifically illustrating the operations of the vibrating body portion 12 of the piezoelectric driving device 300. As illustrated in FIGS. 10A to 10F, the vibrating body portion 12 is deformed from a state (A) to a state (F) in order, and returns to the state (A) again. The operation is repeated while the piezoelectric driving device 300 is driven (while the voltage is applied to the piezoelectric element 30). In addition, in FIGS. 10A to 10F, the rectangular shape illustrated by a dotted line indicates the vibrating body portion 12 (specifically, for convenience, the vibrating body portion 12 in which the protruding portion 12b is not provided) in a state where the piezoelectric driving device 300 is not driven.

In FIGS. 10A to 10F, an ellipse drawn by the boundary portion (for example, protruding portion 12b) between the vibrating body portion 12 and the contact portion 20 is illustrated by z. The protruding portion 12b rotates clockwise. The rotor 4 rotates counterclockwise. A rotating speed of the rotor 4 is substantially constant. The moving speed on the front surface of the rotor 4 is substantially the same as an average speed (an average speed while the piezoelectric driving device 300 is driven and the tip end 20a of the contact portion 20 comes into contact with the rotor 4) in the bending direction speed of the protruding portion 12b.

The state (A) is a state where the vibrating body portion 12 is contracted the most in the vertical direction (longitudinal direction), and the contact portion 20 and the rotor 4 are separated from each other. In the state (A), the moving speed in the first direction (direction which is oriented toward a left side of FIGS. 10A to 10F) of the protruding portion 12b becomes the highest (the highest speed while the piezoelectric driving device 300 is driven).

After a state (B), in a state (C), the contact portion 20 comes into contact with the rotor 4. In the state (C), in the illustrated example, the entire surface of the tip end 20a of the contact portion 20 comes into contact with the rotor 4. In the state (C), the protruding portion 12b moves in the second direction (direction which is oriented toward a right side of FIGS. 10A to 10F). However, since the moving speed of the protruding portion 12b is lower than the rotating speed of the rotor 4, the adhesive portion 24 is deformed, and the protruding portion 12b is placed in a state of being more delayed than the tip end portion 22. The adhesive portion 24 has, for example, a Young's modulus which is smaller than the Young's modulus of the tip end portion 22.

In a state (D), the vibrating body portion 12 is in a state of being stretched the most in the vertical direction, and the moving speed in the second direction of the protruding portion 12b becomes the highest. Therefore, in a state (E), the adhesive portion 24 is deformed, and the protruding portion 12b is placed in a state of being more advanced than the tip end portion 22. In the state (E), the entire surface of the tip end 20a of the contact portion 20 comes into contact with the rotor 4.

In addition, in the state (F), the contact portion 20 is separated from the rotor 4, and again, returns to the state (A).

Here, in the piezoelectric driving device 300, when a spring constant in the bending direction of the contact portion 20 is $K_T$, the maximum displacement amount in the bending direction of the contact portion 20 is $X_{Tmax}$, and a static friction force between the contact portion 20 and the rotor 4 is $F_S$, the following expression (17) is satisfied.

$$K_T \times X_{Tmax} < F_S \qquad (17)$$

Therefore, in the piezoelectric driving device 300, in the state (C) to the state (E), the contact portion 20 can come into contact with the rotor 4 without slipping. A difference between the speed of the tip end portion 22 and the speed of the rotor 4 in the state (C) and the state (E) can be absorbed, for example, as the adhesive portion 24 is deformed (elastically deformed).

In addition, the maximum displacement amount $X_{Tmax}$ in the bending direction of the contact portion 20 is a displacement amount of the protruding portion 12b in the bending direction (the first direction and the second direction), which considers a state where the vibrating body portion 12 is not deformed in the bending direction as a standard (for example, state (D)). Specifically, the maximum displacement amount $X_{Tmax}$ is a half of the length of a component in the bending direction of an ellipse z drawn by the protruding portion 12b. In the illustrated example, the maximum displacement amount $X_{Tmax}$ is the same as a half of the length of a long axis.

The piezoelectric driving device 300 has, for example, the following characteristics.

In the piezoelectric driving device 300, the expression (17) is satisfied. Therefore, the contact portion 20 can come into contact with the rotor 4 without slipping. Accordingly, in the piezoelectric driving device 300, it is possible to minimize wear of the contact portion 20. As a result, in the piezoelectric driving device 300, it is possible to achieve along life of the contact portion 20. For example, in a case where the contact portion is large, even when the contact portion is slightly worn, there is not a large change in characteristics of the piezoelectric driving device, but there is a case where the contact portion 20 of the piezoelectric driving device 300 according to the embodiment is small, for example, satisfying Ws=0.2 mm, Ts=0.2 mm, Ls=0.1 mm, and La=3 μm, and the characteristics of the piezoelectric driving device 300 changes only by slight wear of the contact portion 20. Therefore, in the small contact portion 20, it is important to minimize wear.

Furthermore, in the piezoelectric driving device 300, since the contact portion 20 does not slip with respect to the rotor 4, a restoring force due to the deformation of the vibrating body portion 12 is not reduced, and it is possible to efficiently transmit the restoring force to the rotor 4. Furthermore, in the piezoelectric driving device 300, since apart which comes into contact with the rotor 4 in the contact portion 20 is not displaced with respect to the rotor 4 in the state (C) to the state (E), it is possible to reduce a change in rotating speed or torque of the rotor 4, and to stably perform the driving.

In the piezoelectric driving device 300, for example, on an upper half side (half side on the rotor 4 side) of the ellipse z drawn by the protruding portion 12b, the contact portion 20 can come into contact with the rotor 4, and on a lower half side (half side on a side opposite to the rotor 4) of the ellipse z, the contact portion 20 can be separated from the rotor. Accordingly, the piezoelectric driving device 300 can efficiently transmit the restoring force due to the deformation of the vibrating body portion 12 to the rotor 4.

6. Modification Example of Piezoelectric Driving Device

6.1. First Modification Example

Figure 11:
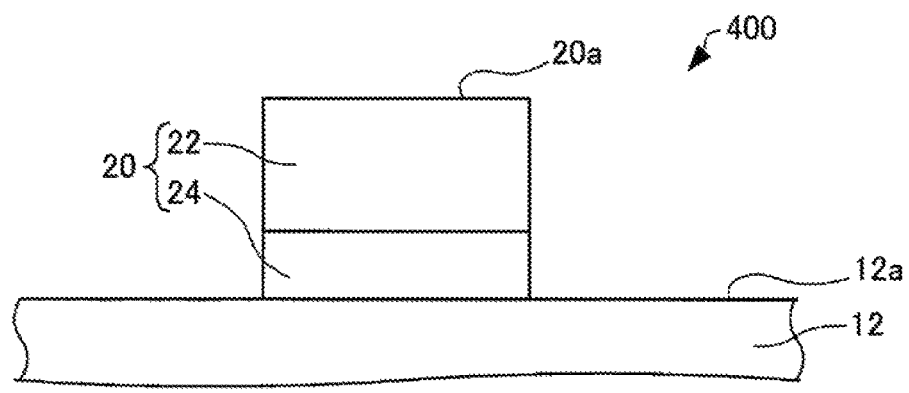
FIG. 11 is a plan view schematically illustrating a piezoelectric driving device according to a first modification example of the second embodiment.

Next, the piezoelectric driving device according to the first modification example of the embodiment will be described with reference to the drawings. FIG. 11 is a plan view schematically illustrating a piezoelectric driving device 400 according to the first modification example of the embodiment.

Hereinafter, in the piezoelectric driving device 400 according to the first modification example of the embodiment, the members having functions similar to those of the configuration members of the piezoelectric driving device 300 according to the embodiment will be given the same numeral references, and the detailed description thereof will be omitted. This is also similar in the piezoelectric driving device according to the second modification example of the embodiment which will be described hereinafter.

In the above-described piezoelectric driving device 300, as illustrated in FIG. 9, the protruding portion 12b is provided at the end portion 12a of the vibrating body portion 12. Meanwhile, in the piezoelectric driving device 400, as illustrated in FIG. 11, the protruding portion 12b is not provided at the end portion 12a.

In the piezoelectric driving device 400, similar to the piezoelectric driving device 300, it is possible to minimize the wear of the contact portion 20.

Figure 12:
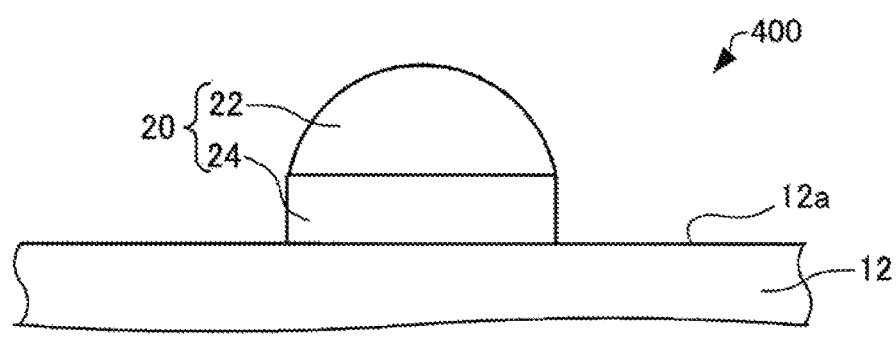
FIG. 12 is a plan view schematically illustrating the piezoelectric driving device according to the first modification example of the second embodiment.
Figure 13:
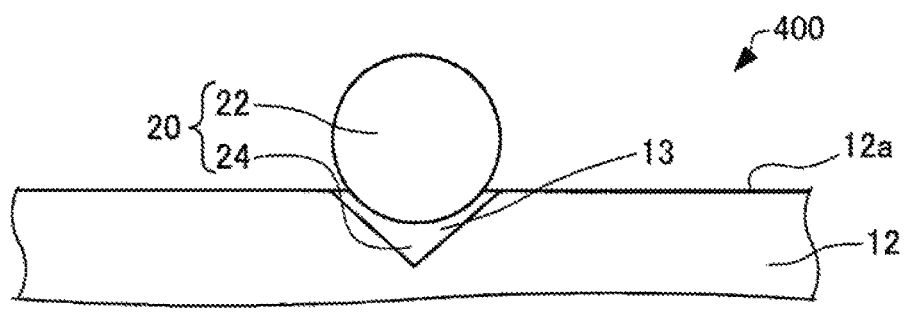
FIG. 13 is a plan view schematically illustrating the piezoelectric driving device according to the first modification example of the second embodiment.

In addition, in the example illustrated in FIG. 11, the shape of the tip end portion 22 is a shape of a rectangular parallelepiped, but the shape of the tip end portion 22 may be a hemispherical shape as illustrated in FIG. 12, and may be a spherical shape as illustrated in FIG. 13. In the example illustrated in FIG. 13, a cutout 13 is provided at the end portion 12a of the vibrating body portion 12, and the adhesive portion 24 fills the cutout 13.

6.2. Second Modification Example

Figure 14:
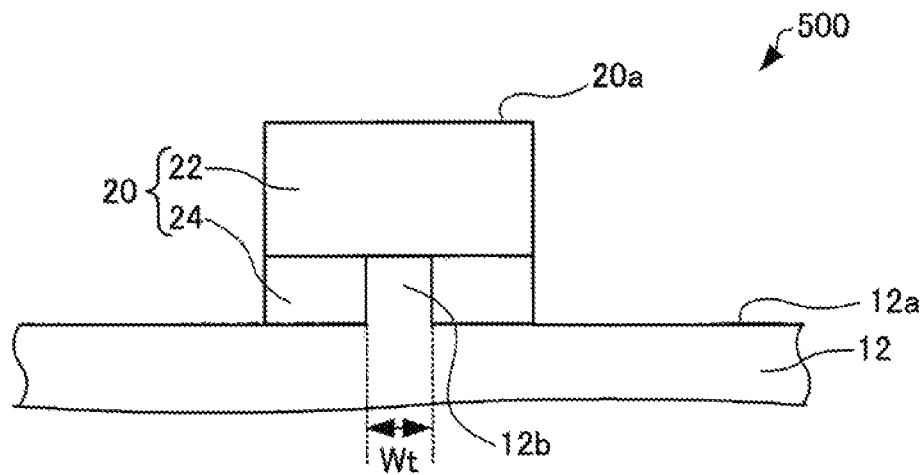
FIG. 14 is a plan view schematically illustrating a piezoelectric driving device according to a second modification example of the second embodiment.

Next, the piezoelectric driving device according to the second modification example of the embodiment will be described with reference to the drawings. FIG. 14 is a plan view schematically illustrating a piezoelectric driving device 500 according to the second modification example of the embodiment.

In the above-described piezoelectric driving device 300, as illustrated in FIG. 9, the vibrating body portion 12 has the protruding portion 12b at the end portion 12a, and the protruding portion 12b is separated from the tip end portion 22. Meanwhile, in the piezoelectric driving device 500, as illustrated in FIG. 14, the vibrating body portion 12 has the protruding portion 12b which protrudes to the tip end portion 22 side and is in contact with the tip end portion 22. The protruding portion 12b is provided at the center portion in the lateral direction of the end portion 12a. Regarding the length in the direction orthogonal to the longitudinal direction and the width direction, the protruding portion 12b and the adhesive portion 24 have the same length. In the example illustrated in FIG. 14, the length in the width direction of the protruding portion 12b is Wt. The length Wt is, for example, 1 μm to 50 μm, and more specifically, 20 μm.

In the piezoelectric driving device 500, similar to the piezoelectric driving device 300, it is possible to minimize wear of the contact portion 20. Furthermore, in the piezoelectric driving device 500, it is possible to independently adjust the spring constant in the longitudinal direction of the contact portion 20 and the spring constant in the bending direction of the contact portion 20 by the protruding portion 12b (refer to "7. Experiment Example" which will be described later for more detail).

Figure 15:
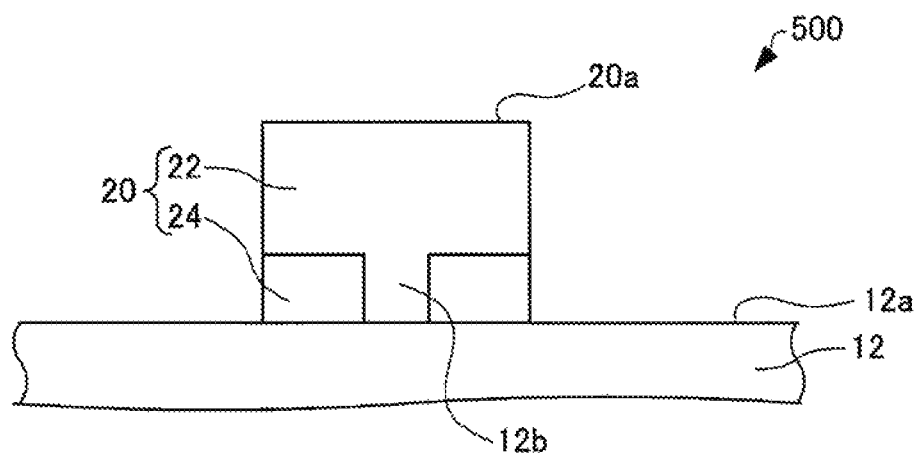
FIG. 15 is a plan view schematically illustrating the piezoelectric driving device according to the second modification example of the second embodiment.

In addition, as illustrated in FIG. 15, the vibrating body portion 12 does not have the protruding portion 12b, and the tip end portion 22 may have the protruding portion 12b which protrudes to the vibrating body portion 12 side and is in contact with the vibrating body portion 12.

7. Experiment Example

Hereinafter, an experiment example will be illustrated, and the invention will be described in more detail. In addition, the invention is not limited to any of the following experiment examples.

7.1. Computation Regarding Spring Constant

A static friction coefficient between the contact portion and the rotor is μs, a static friction force between the contact portion and the rotor is $F_S$, the maximum displacement amount in the bending direction of the contact portion is $X_{Tmax}$, a pushing force which presses (pushes) the tip end of the contact portion in the vertical direction is $F_{Pr}$, and a spring constant in the bending direction of the contact portion is $K_T$. Even when the contact portion is displaced the most, the condition for not being slipped with respect to the rotor becomes the following equation (18). Therefore, in a case where the static friction coefficient μs=0.5, the maximum displacement amount $X_{Tmax}$=1 μm, the pushing force $F_{Pr}$=0.5N, when the following equation (19) is satisfied, even when the contact portion is displaced the most in the bending direction, the contact portion does not slip with respect to the rotor.

$$F_S = \mu s \times F_{Pr} > K_T \times X_{Tmax} \quad (18)$$

$$K_T < (\mu s \times F_{Pr})/X_{Tmax} = 2.5 \times 10^5 \text{ N/m} \quad (19)$$

7.2. Simulation Regarding Spring Constant

7.2.1. Simulation in Model illustrated in FIG. 11

Considering the above-described contact portion illustrated in FIG. 11 as a model, the deformation amount of the contact portion when 1 N is applied to the tip end of the contact portion in the longitudinal direction was obtained by simulation using a finite element method. In addition, the spring constant was calculated from the obtained deformation amount. As the tip end portion of the contact portion, alumina was assumed. Each dimension and Young's modulus are as follows.

Young's Modulus of Tip end portion: $3.7 \times 10^{11}$ N/m$^2$
Length Ws of Tip end portion and Adhesive Portion: 200 μm
Length Ts of Tip end portion and Adhesive Portion: 200 μm
Length Ls of Tip end portion: 100 μm
Young's Modulus of Adhesive Portion: $3 \times 10^7$ N/m$^2$
Length La of Adhesive Portion: 3 μm The following Table 1 illustrates a relationship between the displacement amount and the spring constant which are obtained by the simulation. From the Table 1, it can be ascertained that it is possible to reduce the spring constant in the bending direction to be smaller than $2.5 \times 10^5$ N/m which is obtained by the computation of the above-described "7.1.", in the above-described condition.

TABLE 1

|  | Displacement amount [μm] | Spring constant [N/m] |
| --- | --- | --- |
| Longitudinal direction | 0.76 | 1.3E+06 |
| Bending direction | 6.3 | 1.6E+05 |

7.2.2. Simulation in Model Illustrated in FIG. 14

Next, considering the above-described contact portion illustrated in FIG. 14 as a model, simulation which is the same as that of the above-described "7.2.1" was performed. The simulation was performed under the same condition as that of the above-described "7.2.1." except for following conditions. As the vibrating body portion, silicon is assumed.

Length La of Adhesive Portion: 10 μm
Young's Modulus of Vibrating Body Portion (Protruding Portion): $1.59 \times 10^{11}$ N/m$^2$
Length Wt of Protruding Portion: 20 μm The following Table 2 illustrates a relationship between the displacement amount and the spring constant which are obtained by the simulation. From the Table 2, it can be ascertained that it is possible to reduce the spring constant in the bending direction to be smaller than $2.5 \times 10^5$ N/m, and to make the spring constant in the longitudinal direction be a value different from that of the model illustrated in FIG. 11. In other words, it can be ascertained that it is possible to independently adjust the spring constant in the longitudinal direction and the spring constant in the bending direction of the contact portion with the protruding portion.

TABLE 2

|  | Displacement amount [μm] | Spring constant [N/m] |
| --- | --- | --- |
| Longitudinal direction | 0.037 | 2.7E+07 |
| Bending direction | 5.9 | 1.7E+05 |

8. Device which Uses Piezoelectric Driving Device

The piezoelectric driving device according to the invention can impart a large force to the driven body by using resonance, and can be employed in various devices. The piezoelectric driving device according to the invention can be used as a driving device in various types of equipment, such as, a robot (including an electronic component transporting device (IC handler)), a pump for administering a medicine, a calendar feeding device of a time piece, or a paper feeding mechanism of a printing device. Hereinafter, representative embodiments will be described. Hereinafter, as the piezoelectric driving device according to the invention, a device including the piezoelectric driving device 100 (300) will be described.

8.1. Robot

Figure 16:
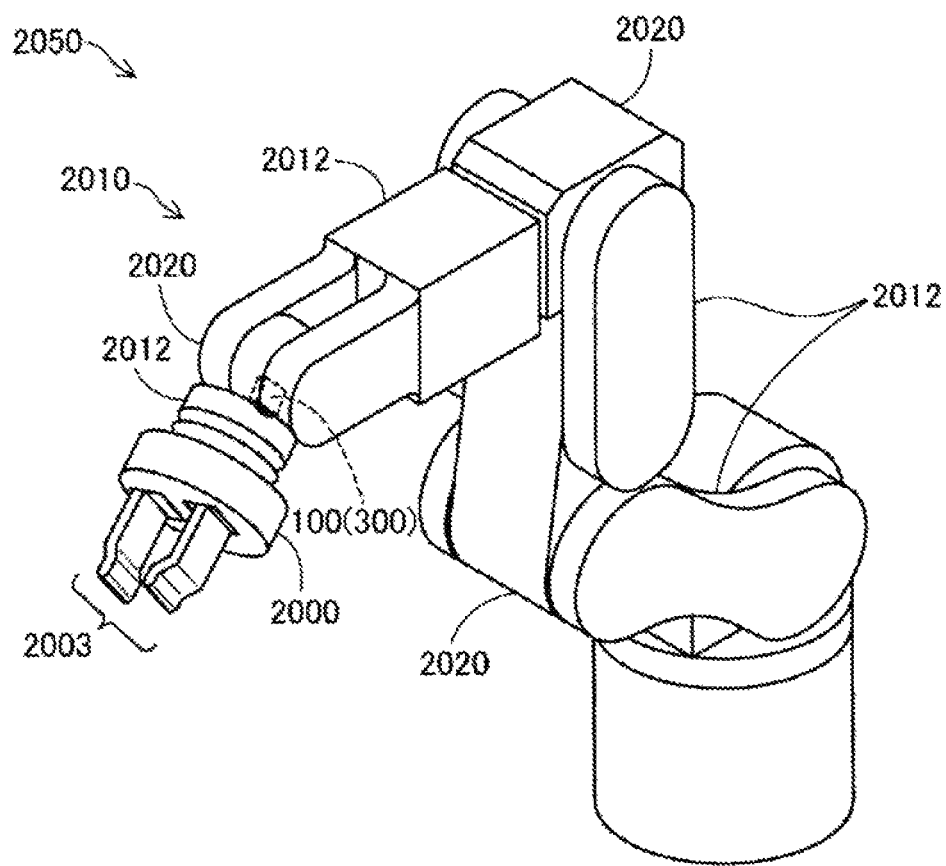
FIG. 16 is a view illustrating a robot according to the embodiment.

FIG. 16 is a view illustrating a robot 2050 which uses the piezoelectric driving device 100 (300). The robot 2050 includes an arm 2010 (also referred to as "arm portion") including a plurality of ring portions 2012 (also referred to as "ring member"), and a plurality of joints 2020 which connect the ring portions to each other in a state of being capable of rotating or bending between the ring portions 2012.

In each of the joints 2020, the piezoelectric driving device 100 (300) is embedded, and it is possible to rotate or bend the joint 2020 only by an arbitrary angle by using the piezoelectric driving device 100 (300). A robot hand 2000 is connected to a tip end of the arm 2010. The robot hand 2000 is provided with one pair of holding portions 2003. In the robot hand 2000, the piezoelectric driving device 100 (300) is also embedded, and it is possible to hold a thing by opening and closing the holding portion 2003 by using the piezoelectric driving device 100 (300). In addition, the piezoelectric driving device 100 (300) is also provided between the robot hand 2000 and the arm 2010, and it is possible to rotate the robot hand 2000 with respect to the arm 2010 by using the piezoelectric driving device 100 (300).

Figure 17:
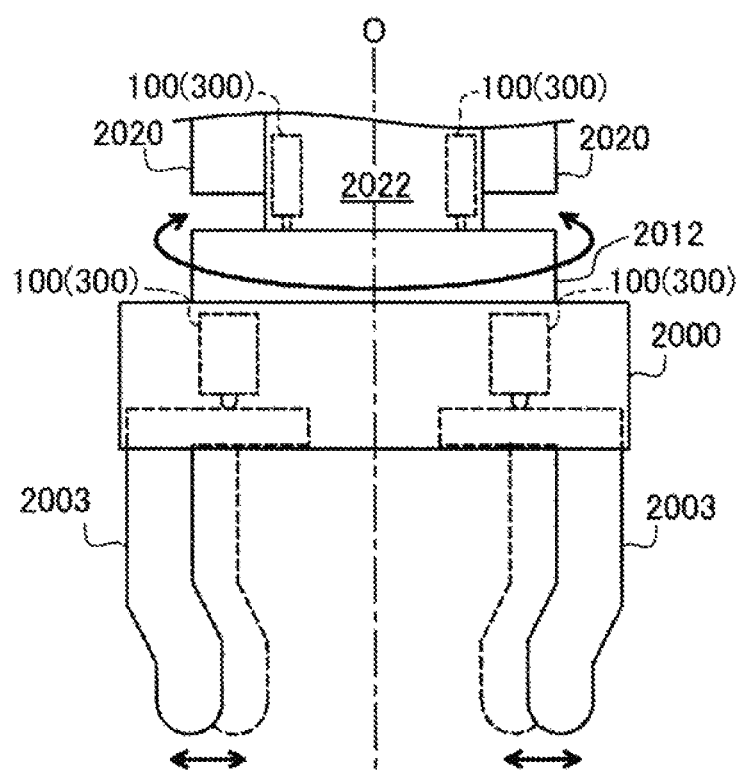
FIG. 17 is a view illustrating a wrist portion of the robot according to the embodiment.

FIG. 17 is a view illustrating a wrist portion of the robot 2050 illustrated in FIG. 16. The joint 2020 of the wrist nips a wrist rotating portion 2022, the ring portion 2012 of the wrist is attached to the wrist rotating portion 2022 to be rotatable around a center axis O of the wrist rotating portion 2022. The wrist rotating portion 2022 is provided with the piezoelectric driving device 100 (300), and the piezoelectric driving device 100 (300) rotates the ring portion 2012 of the wrist and the robot hand 2000 around the center axis O. In the robot hand 2000, the plurality of holding portions 2003 stand. A base end portion of the holding portion 2003 can move in the robot hand 2000, and the piezoelectric driving device 100 (300) is loaded at a part of a root of the holding portion 2003. Therefore, by operating the piezoelectric driving device 100 (300), it is possible to hold a target by moving the holding portion 2003. In addition, the robot is not limited to the single-arm robot, and the piezoelectric driving device 100 (300) can also be employed in a multi-arm robot in which the number of arms is two or more.

Here, on the inside of the joint 2020 of the wrist or the robot hand 2000, in addition to the piezoelectric driving device 100 (300), a power line which supplies power to various devices, such as a force/torque sensor or a gyro sensor, or a signal line which transmits a signal, are included, and extremely large number of wirings are necessary. Therefore, it is extremely difficult to dispose the wiring on the inside of the joint 2020 or the robot hand 2000. However, since the piezoelectric driving device 100 (300) can reduce a driving current to be smaller than that of a general driving motor, it is also possible to dispose the wiring in a small space similar to the joint 2020 (in particular, the joint of the tip end of the arm 2010), or the robot hand 2000.

8.2. Pump

Figure 18:
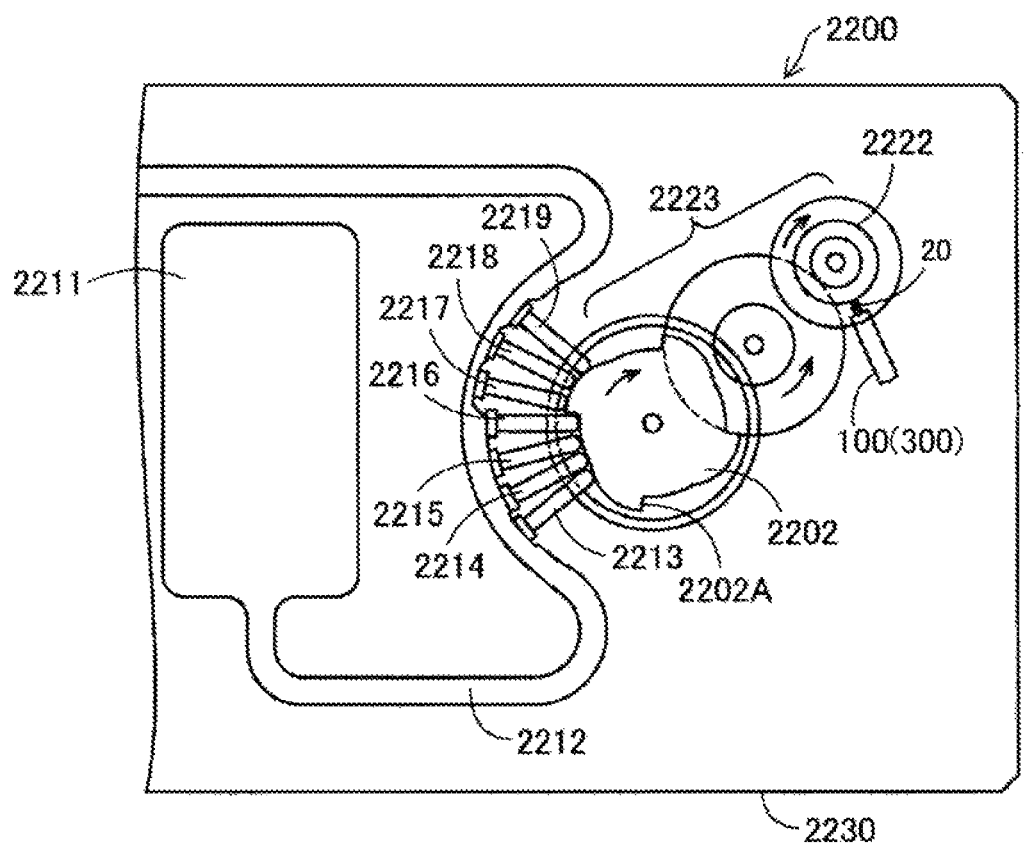
FIG. 18 is a view illustrating a pump according to the embodiment.

FIG. 18 is a view illustrating an example of a liquid feeding pump 2200 which uses the piezoelectric driving device 100 (300). The liquid feeding pump 2200 includes a reservoir 2211, a tube 2212, the piezoelectric driving device 100 (300), a rotor 2222, a deceleration transmission mechanism 2223, a cam 2202, a plurality of fingers 2213, 2214, 2215, 2216, 2217, 2218, and 2219, in a case 2230.

The reservoir 2211 is an accommodation portion for accommodating liquid which is a transport target. The tube 2212 is a tube for transporting the liquid fed out of the reservoir 2211. The contact portion 20 of the piezoelectric driving device 100 (300) is provided in a state of being pressed to a side surface of the rotor 2222, and the piezoelectric driving device 100 (300) is driven to rotate the rotor 2222. A rotating force of the rotor 2222 is transmitted to the cam 2202 via the deceleration transmission mechanism 2223. The fingers 2213 to 2219 are members for blocking (closing) the tube 2212. When the cam 2202 rotates, the fingers 2213 to 2219 are pressed to the outside in the radial direction in order by a protruding portion 2202A of the cam 2202. The fingers 2213 to 2219 block the tube 2212 in order from the upstream side (reservoir 2211 side) in the transporting direction. Accordingly, the liquid in the tube 2212 is transported to the downstream side in order. Then, it is possible to feed an extremely small amount of liquid with high accuracy, and further, to realize the small liquid feeding pump 2200.

In addition, the disposition of each member is not limited to that illustrated in the drawing. In addition, members, such as the fingers, may be not be provided, and a ball or the like provided in the rotor 2222 may be configured to block the tube 2212. The above-described liquid feeding pump 2200 can be utilized in a device for administering a medicine or the like which administers a liquid medicine, such as insulin, into a human body. Here, since it is possible to reduce the driving current to be smaller than that of a general driving motor by using the piezoelectric driving device 100 (300), it is possible to suppress power consumption of the device for administering a medicine. Therefore, in a case where the device for administering a medicine is driven by batteries, the piezoelectric driving device 100 (300) is particularly effective.

In the invention, a part of configuration may be omitted within a range of achieving the characteristics or effects which are described in the specification, or each embodiment or modification example may be combined with each other.

The invention includes a configuration (for example, a configuration in which the functions, the method, and the effects are the same, or a configuration in which the object and the effects are the same) which is substantially the same as the configuration described in the embodiments. In addition, the invention includes a configuration in which parts which are not essential in the configuration described in the embodiments are replaced. In addition, the invention includes a configuration which achieves the action and effect that are the same as those of the configuration described in the embodiments, or which can achieve an object that is the same as that of the configuration described in the embodiments. In addition, the invention includes a configuration obtained by adding a known technology to the configuration described in the embodiments.

The entire disclosures of Japanese Patent Application Nos. 2015-236650, filed Dec. 3, 2015 and 2015-236651, filed Dec. 3, 2015 are expressly incorporated by reference herein.

What is claimed is:

1. A piezoelectric driving device comprising: a substrate including a fixed portion, and a vibrating body portion which is provided with a piezoelectric element and is supported by the fixed portion; and a contact portion which comes into contact with a driven body, and transmits movement of the vibrating body portion to the driven body, wherein the contact portion is provided at an end portion in the a longitudinal direction of the vibrating body portion, and wherein a difference between a distance between the end portion when the contact portion is not pressed against the driven body and a tip end of the contact portion, and a distance between the end portion when the contact portion is pressed against the driven body and the tip end, is smaller than a total amplitude in the a longitudinal direction in a case where the vibrating body portion is driven, wherein the contact portion includes a tip end portion which is configured of the tip end, and an adhesive portion, which is provided between the tip end portion and the vibrating body portion, and wherein, when a length in a longitudinal direction of the tip end portion is Ls, a length in a width direction orthogonal to a longitudinal direction of a contact surface between the tip end portion and the adhesive portion is Ws, a length in the direction orthogonal to a longitudinal direction and the width direction of the contact surface is Ts, Young's modulus of the tip end portion is Es, and a Young's modulus of the adhesive portion is Ea, the total amplitude is Xo and a pushing force of the driven body on the contact portion is Fo, a length La in a longitudinal direction of the adhesive portion satisfies a relationship of $La < (Xo/Fo) \times Ea \times Ws \times Ts - (Ls \times Ea)/Es$.

2. The piezoelectric driving device according to claim 1, wherein, when the total amplitude is Xo and the pushing force of the driven body on the contact portion is Fo, a spring constant K in the a longitudinal direction of the contact portion satisfies a relationship of $K > Fo/Xo$.

3. A motor comprising:
the piezoelectric driving device according to claim 1; and
a rotor which is rotated by the piezoelectric driving device.

4. A motor comprising:
the piezoelectric driving device according to claim 2; and
a rotor which is rotated by the piezoelectric driving device.

5. A robot comprising:
a plurality of ring portions;
a joint which connects the plurality of ring portions to each other; and
the piezoelectric driving device according to claim 1 which rotates the plurality of ring portions by the joint.

6. A robot comprising:
a plurality of ring portions;
a joint which connects the plurality of ring portions to each other; and
the piezoelectric driving device according to claim 2 which rotates the plurality of ring portions by the joint.

7. A pump comprising:
the piezoelectric driving device according to claim 1;
a tube which transports liquid; and
a plurality of fingers which close the tube by driving of the piezoelectric driving device.

8. A pump comprising:
the piezoelectric driving device according to claim 2;
a tube which transports liquid; and
a plurality of fingers which close the tube by driving of the piezoelectric driving device.

* * * * *